United States Patent
Falstrup et al.

(10) Patent No.: US 10,453,262 B1
(45) Date of Patent: Oct. 22, 2019

(54) APPARATUS AND METHOD FOR DYNAMIC REFLECTING CAR MIRRORS IN VIRTUAL REALITY APPLICATIONS IN HEAD MOUNTED DISPLAYS

(71) Applicant: Relay Cars LLC, Rancho Dominguez, CA (US)

(72) Inventors: David Falstrup, Rancho Dominguez, CA (US); Thom Denick, Rancho Dominguez, CA (US); Alex McClain, Rancho Dominguez, CA (US); Aaron Johnson, Rancho Dominguez, CA (US); Seth Peterson, Rancho Dominguez, CA (US); Pat Hadnagy, Los Angeles, CA (US)

(73) Assignee: RELAY CARS LLC, Rancho Dominguez, CA (US)

(*) Notice: Subject to any disclaimer, the term of this patent is extended or adjusted under 35 U.S.C. 154(b) by 0 days.

(21) Appl. No.: 15/655,415

(22) Filed: Jul. 20, 2017

Related U.S. Application Data

(60) Provisional application No. 62/365,013, filed on Jul. 21, 2016.

(51) Int. Cl.
  G06T 19/00 (2011.01)
  G06T 3/00 (2006.01)
  G06T 15/80 (2011.01)

(52) U.S. Cl.
  CPC .......... *G06T 19/006* (2013.01); *G06T 3/0087* (2013.01); *G06T 15/80* (2013.01); *G06T 2210/61* (2013.01); *G06T 2215/12* (2013.01); *G06T 2215/16* (2013.01)

(58) Field of Classification Search
  None
  See application file for complete search history.

(56) References Cited

U.S. PATENT DOCUMENTS

| | | | |
|---|---|---|---|
| 7,246,103 B2 | 7/2007 | Herbrich et al. | |
| 8,160,391 B1* | 4/2012 | Zhu | G06T 5/005 345/629 |
| 2002/0003571 A1* | 1/2002 | Schofield | B60C 23/00 348/148 |

FOREIGN PATENT DOCUMENTS

| | | |
|---|---|---|
| CN | 1175471 A | 3/1998 |
| CN | 100589148 C | 2/2010 |
| CN | 103479138 A | 1/2014 |
| CN | 205982822 | 2/2017 |
| WO | WO01/61672 | 8/2001 |
| WO | WO2014197230 | 12/2014 |

* cited by examiner

*Primary Examiner* — Yanna Wu
(74) *Attorney, Agent, or Firm* — Socal IP Law Group LLP; Mark Andrew Goldstein

(57) ABSTRACT

An apparatus and method for the creation of dynamically reflecting car mirrors in a virtual application using a proprietary layered panorama method. This approach utilizes the panoramic background as a source image for the reflection and specially produced masks for the mirrors in each stereo panoramic vehicle image.

6 Claims, 3 Drawing Sheets

APPARATUS AND METHOD FOR DYNAMIC REFLECTING CAR MIRRORS IN VIRTUAL REALITY APPLICATIONS IN HEAD MOUNTED DISPLAYS

CROSS-REFERENCE TO RELATED APPLICATION

This patent application claims priority to Provisional Application No. 62/365,013 filed on Jul. 21, 2016.

BACKGROUND OF THE INVENTION

1. Field of the Invention

The present invention relates to the field of creating virtual reality applications in head mounted displays and in particular, utilizing the technology to provide an individual with a virtual experience of driving a vehicle and viewing the surroundings.

2. Description of the Prior Art

The following six patents and published patent applications are the closest prior art known to the inventor.
1. U.S. Pat. No. 7,246,103 issued to Ralf Herbrich et al. on Jul. 17, 2007 for "Probalistic Model of Distraction for a Virtual Reality Environment" (hereafter the "Herbrich Patent");
2. Chinese Patent No. CN1175471A issued to Inoue Yoshihisa on Mar. 11, 1998 for "Driving Game Machine, Method of Displaying Images in Driving Game Machine, and Recording Medium Storing Driving Game Program" (hereafter the "Yoshihisa Chinese Patent");
3. PCT Publication No. WO 01/61672 to Steven Low et al. on Aug. 23, 2001 for "Virtual Reality Test Drive System" (hereafter the "Low PCT Publiation");
4. Chinese Patent No. CN100589148C issued to Zhang Mingmin et al. on Feb. 10, 2010 for "Method for Implementing Automobile Driving Analog Machine Facing to Disciplinarian" (hereafter the "Mingmin Chinese Patent");
5. Chinese Patent No. CN103479138A issued to Luo Yi on Jan. 1, 2014 for "Interactive Virtual Reality Car Show Platform" (hereafter the "Yi Chinese Patent");
6. PCT Publication No. WO 2014/197230 to David Perry on Dec. 11, 2014 for "Systems and Method for Using Reduced Hops to Generate an Augmented Virtual Reality Scene Within a Head Mounted System" (hereafter the "Perry PCT Publication".
7. Chinese Patent No. CN205982822 issued to Jiaxing Xuanshi Information Tech Co Ltd. on Feb. 22, 2017 for "A Virtual Reality Viewing Mirror" (hereafter the "Jiaxing Xuanshi Chinese Patent").

The Hebrich Patent discloses a computer game software for racing cars to simulate players playing against each other on a race track.

The Yoshida Chinese Patent is also a computer game patent including automobile racing. The game enables a player to see where the player's race car is positioned relative to other cars on the racetrack, including simulated views from a simulated rear view mirror.

The Low PCT Publication discloses in general a virtual reality system simulating driving a vehicle including a visual display built into a screen in a helmet worn by a user.

The Yi Chinese Patent discloses an interactive virtual reality car show platform simulating cars in a virtual reality setting.

The Minguin Chinese Patent is used for training a person how to drive a car. The patent is owned by a school for training students who are seeking to learn how to drive a car.

The Perry PCR Publication discloses a head mounted display for playing a game through a game cloud system.

The Jiaxing Xuanshi Chinese Patent discloses a virtual Reality viewing mirror.

To the best of the present inventors' knowledge, the above identified references are the only third party relevant references.

SUMMARY OF THE INVENTION

The present invention is a novel, useful and non-obvious apparatus and method for the creation of dynamically reflecting car mirrors in a virtual application using a proprietary layered panorama method as described and claimed in co-pending patent application Ser. No. 15/223,638 for "LAYERED PANORAMAS FOR VIRTUAL REALITY (VR) ("'638 application") and assigned to the same assignee as the present invention.

This novel approach utilizes the panoramic background as a source image for the reflection and specially produced masks for the mirrors in each stereo panoramic vehicle image. The basic panoramic background technology is described and claimed in co-pending patent application Ser. No. 15/470,575 for AUTOMOTIVE CONFIGURATORS USED IN VIRTUAL REALITY APPLICATIONS ("'575 application"), and assigned to the same assignee as the present invention.

The camera used with the present invention and related technology is described and claimed in co-pending patent application Ser. No. 15/081,752 for METHOD AND APPARATUS FOR CREATION OF THREE-DIMENSIONAL PHOTOGRAPHY OF AUTOMOTIVE VEHICLE INTERIORS FOR USE WITH A VIRTUAL REALITY DISPLAY ("'752 application"), assigned to the same assignee as the present invention.

It is an object of the present invention to utilize an apparatus and method for the creation of dynamically reflecting car mirrors in a virtual reality application using the proprietary layered panoramas method of the '638 application.

It is a further object of the present invention to utilize a panoramic background as a source image for the reflection and specially produced masks for the mirrors in each stereo panoramic vehicle image.

It is a further object of the present invention to create a virtual reality (VR) application to dynamically produce realistic reflection in the mirror that will change if the environment changes. This helps complete the realism and immersion of the experience while allowing the flexibility to place vehicles within an environment as well as to place environments for a vehicle.

It is an additional object of the present invention to have a unique method that allows a user exploring a vehicle to experience a more immersive and realistic environment with the side and rear view mirrors to accurately reflect the environment of the vehicle setting.

Defined in detail, the present invention is a method comprising:
 a. outlining mirror areas in a vehicle;
 b. outlining a rear view mirror, a driver's side mirror and a passenger side mirror;

c. filling said outlined rear view mirror with a white mask, filling said outlined driver's side mirror with white mask, and filling said outlined passenger side mirror with a white mask;
d. filling each white mask described in step "c" with an image simulating a reflected mirror image of at least one environment at least behind said vehicle;
e. separating each image as viewed from a reflection from each of said rear view mirror, driver's side mirror and passenger side mirror;
f. creating a separate environmental panoramic image from each image obtained from step "e" by using a camera to create a reflected panoramic image from each of said mirrors, including:
   (i) placing a camera facing toward a rear of the vehicle to obtain each reflected mirror image,
   (ii) inverting each camera image obtained from step (f)(I) to create reflection,
   (iii) darkening each camera image from step (f)(ii) to mimic real mirror behavior; and
   (iv) projecting each camera image obtained from step (f)(iii into a shader to create an illusion that each of said rear view mirror, driver's side mirror and passenger side mirror are reflecting said environment in reverse.

Defined more broadly, the present invention is a method comprising:
a. outlining at least one mirror area in a vehicle;
b. filling said at least one outlined mirror with a white mask;
c. filling said white mask described in step "b" with an image simulating a reflected mirror image of at least one environment at least behind said vehicle;
d. separating each image as viewed from a reflection from each said mirror;
e. creating a separate environmental panoramic image from said image obtained from step "d" by using a camera to create a reflected panoramic image from said mirror, including:
   (i) placing a camera facing toward a rear of the vehicle to obtain a reflected mirror image,
   (ii) inverting each camera image obtained from step (e)(i) to create reflection,
   (iii) darkening said camera image from step (e)(ii) to mimic real mirror behavior; and
   (iv) projecting said camera image obtained from step (e)(iii) into a shader to create an illusion that said mirror is reflecting said environment in reverse.

Defined alternatively, the present invention is a method comprising:
a. placing a vehicle with mirrors into a virtual reality application;
b. creating a specially produced vehicle panoramic stereo image which includes a unique mask for each mirror visible from within the vehicle;
c. creating a projected background stereo environment;
d. creating an alpha mask to represent each mirror position in said vehicle panoramic stereo image and using shader technology as a mask to only show a reflection in each area of each mirror; and
e. simulating a test drive video of the vehicle including a script assigning a moving video texture as the main texture of a custom shader combined with the alpha mask to display each mirror reflection of a video environment in each mirror of the vehicle.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

The present invention is an apparatus and method for the creation of dynamically reflecting car mirrors in a virtual application using a proprietary layered panorama method. This approach utilizes the panoramic background as a source image for the reflection and specially produced masks for the mirrors in each stereo panoramic vehicle image.

Figure 1:
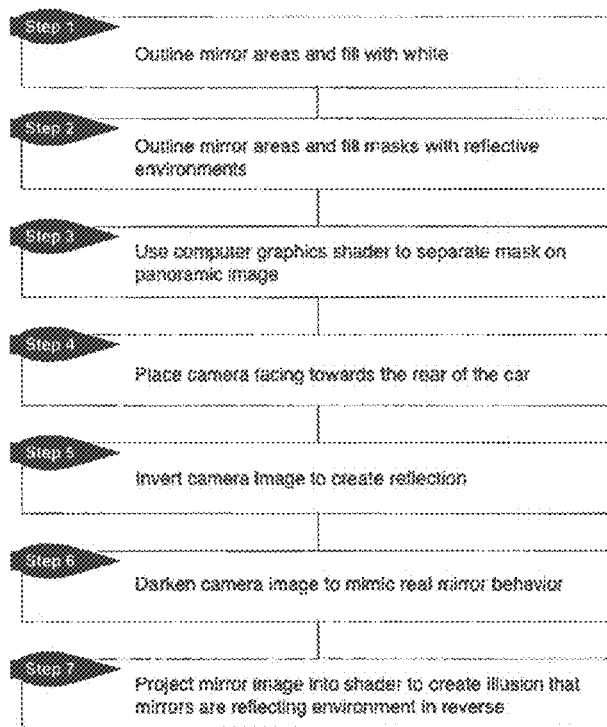
FIG. 1 is a flow chart setting forth the steps of the present invention.
Figure 2:
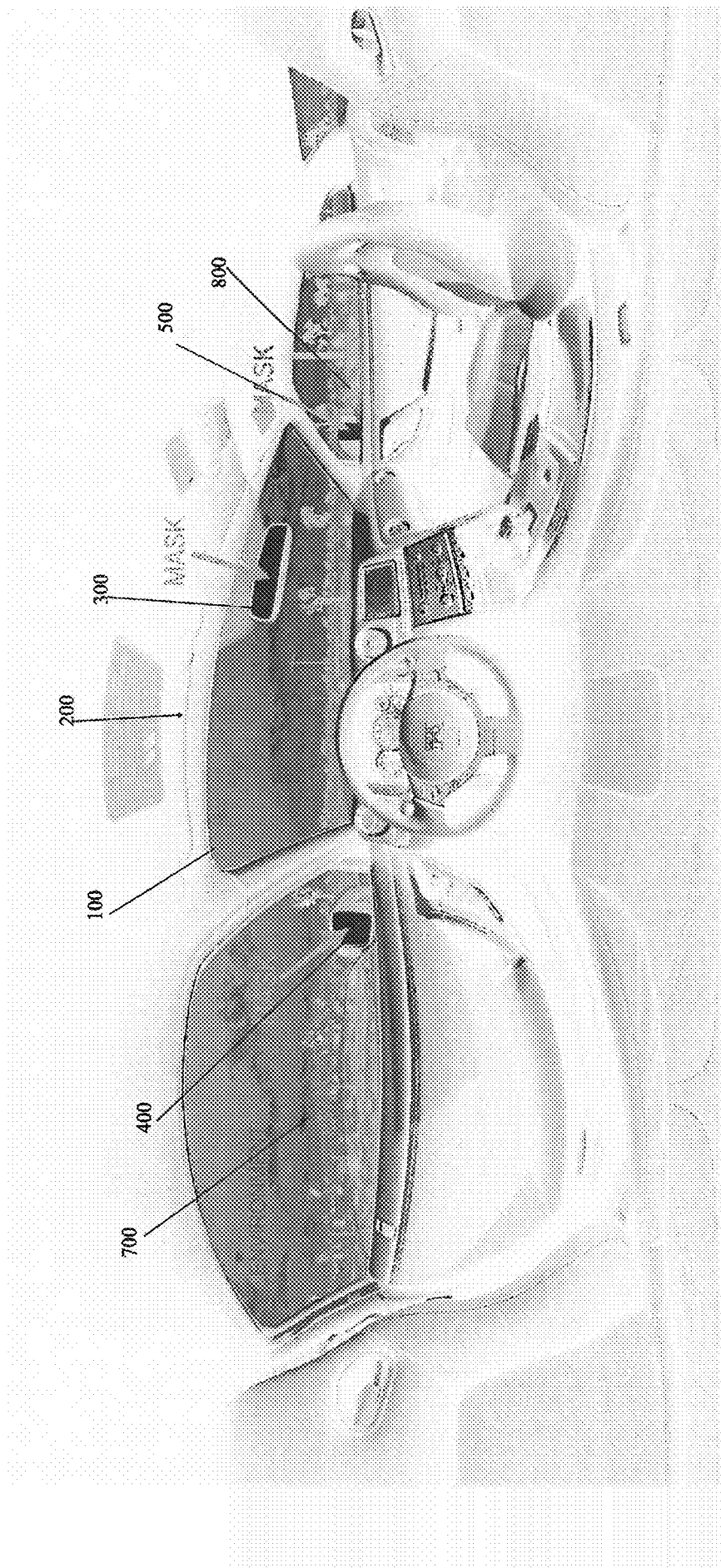
FIG. 2 is an image of a specially produced vehicle panoramic stereo image including step 1 illustrating the outline mirror area in a vehicle, in particular the rear view mirror, the driver's side mirror and the passenger side mirror.
Figure 3:
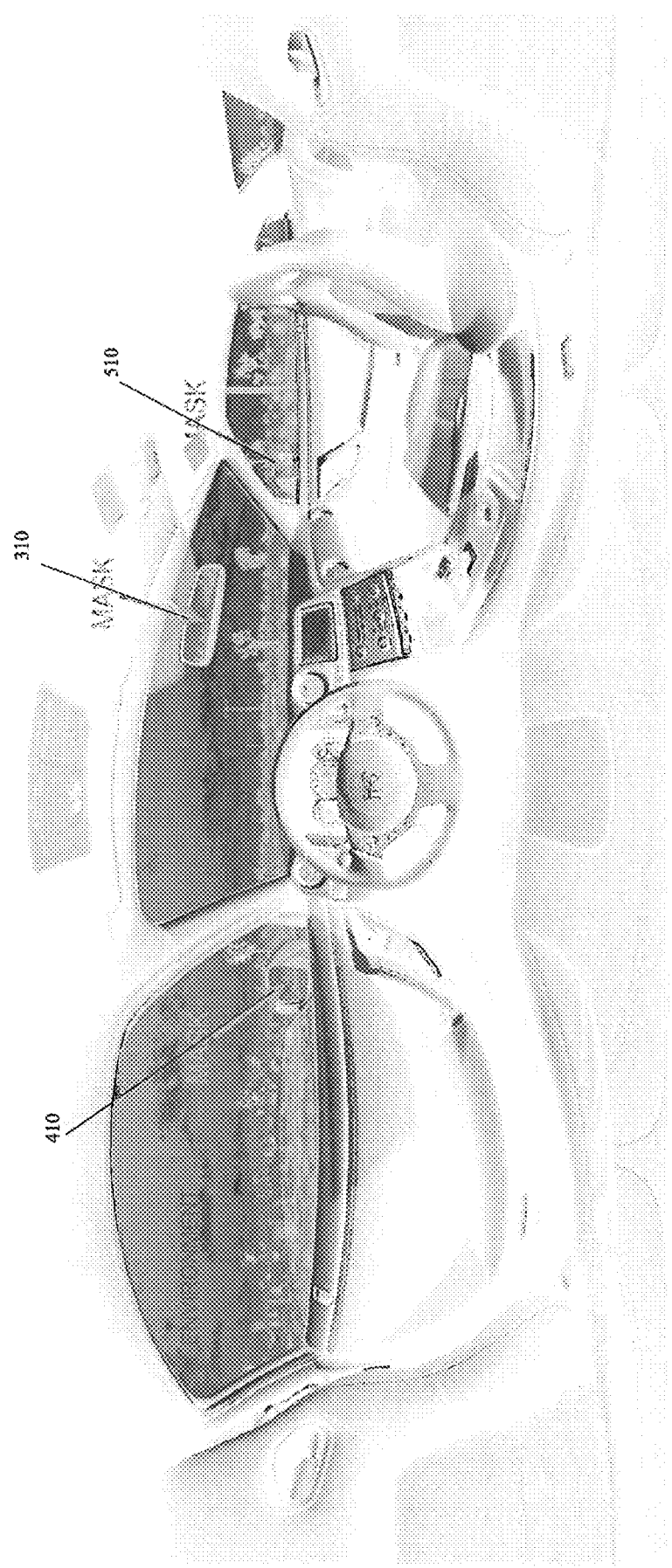
FIG. 3 is an image of a specially produced vehicle panoramic stereo image including step 2 which is filling the outlined mirrors with white, this is a mask without environment for use within a game engine software application, and there is also illustrated in both FIG. 2 and FIG. 3 an example of a projection of a background stereo environment when viewed from the mirrors.

In summary, as outlined in the flow chart in FIG. 1, the present invention involves the following steps, referring to both FIG. 2 and FIG. 3:

Step 1. Outline mirror area 100 in a vehicle 200, in particular the rear view mirror 300, the driver's side mirror 400, and the passenger side mirror 500, and fill the outlined mirrors with white 310, 410, and 510. This is a mask without environment for use within a game engine. This is illustrated in both FIGS. 2 and 3.

Step 2. Outline mirror areas and fill masks with reflected mirror environments 600 for reflected mirror environment from the rear view mirror, reflected environment for driver's side mirror 700 and reflected environment for passenger side mirror 800—using a mask with computer graphics application. This step is also illustrated in FIG. 2;

Step 3. Use computer graphics shader to separate mask on delivered panoramic image;

Step 4. Place camera facing toward the rear of the vehicle;

Step 5. Invert camera image to create reflection;

Step 6. Darken camera image to mimic real mirror behavior; and

Step 7. Project camera image into shader to create illusion that mirrors are reflecting environment in reverse.

Features:

This method allows the application to dynamically produce a realistic reflection in the mirror that will change if the environment changes. This helps complete the realism and immersion of the experience while allowing the flexibility to replace vehicles within an environment as well as replace environments for a vehicle and retain mirror reflections.

Processes:

The application allows reflections in vehicle mirrors through the following key processes:

1. Referring to FIG. 2, there is illustrated each specially produced vehicle panoramic stereo image which includes a unique mask for each mirror visible from within the vehicle.

2. Referring to both FIGS. 2 and 3, there is illustrated a projected background stereo environment utilizing a Unity software program with special adaptations created by the present inventors.

3. Realistic mirrors are achieved using shader technology found in game engines. To achieve this, first an alpha mask must be created to represent the mirrors' position in the panorama. This is a large image that only contains two colors: white and transparency. The shader uses this image as a mask to only show the reflection in the mirror areas.

4. Once the main test drive video begins playing, a script assigns the moving video texture as the main texture on the custom shader. Combined with the alpha mask, this displays a perfect reflection of the video environment in the mirrors.

5. Additionally, a color combine is applied to this video texture before it is applied to the mirrors to darken the video (to represent the normal dimming effect mirrors experience when reflecting light).

Benefits:

This unique method allows the user exploring the vehicle interior to experience a more immersive and realistic environment with the side and rear view mirrors to accurately reflect the environment of the vehicle's setting.

This apparatus and method require the combination of many unique items and special programming to create the present invention. The present invention is a substantial improvement over developers who only retouch in reflections into the mirrors rather than dynamically generate them in accordance with the present invention.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method comprising:
   a. outlining mirror areas in a vehicle;
   b. outlining a rear view mirror, a driver's side mirror and a passenger's side mirror;
   c. filling said outlined rear view mirror with a white mask, filling said outlined driver's side mirror with a white mask, and filling said outlined passenger's side mirror with a white mask;
   d. filling each white mask with an image simulating a reflected mirror image of at least one environment at least behind said vehicle;
   e. separating each image as viewed from a reflection from each of said rear view mirror, said driver's side mirror and said passenger's side mirror;
   f. creating a separate environmental panoramic image from each image obtained from step "e" by using a camera to create a reflected panoramic image from each of said mirrors, including, for each of said mirrors:
      i. placing the camera facing toward a rear of the vehicle to obtain the reflected panoramic image,
      ii. inverting the reflected panoramic image obtained from step (f)(i) to create an inverted panoramic image,
      iii. darkening the inverted panoramic image from step (f)(ii); and
      iv. projecting the darkened inverted panoramic image obtained from step (f)(iii) into a shader program to create an illusion that each of said rear view mirror, driver's side mirror and passenger's side mirror are reflecting said at least one environment in reverse.

2. The method in accordance with claim 1, wherein each said at least one environment in step "d" is created from a computer graphics application.

3. The method in accordance with claim 1, wherein the creating a separate environmental panoramic image includes using the shader program to separate each reflected panoramic image from said rear view mirror, said driver's side mirror and said passenger's side mirror.

4. A method comprising:
   a. outlining mirror areas of a vehicle;
   b. filling the outlined mirror areas with a white mask;
   c. filling said white mask with an image simulating a reflected mirror image of an environment behind said vehicle;
   d. separating the reflected mirror image as viewed as a reflection from each of a rear view mirror, a driver's side mirror and a passenger's side mirror associated with said mirror areas;
   e. creating separate environmental panoramic images from each said separated reflected mirror image from the rear view mirror, the driver's side mirror and the passenger's side mirror obtained from step "d" by using a camera to create a reflected panoramic image from each of the rear view mirror, the driver's side mirror and the passenger's side mirror, including, for each of the rear view mirror, the driver's side mirror and the passenger's side mirror:
      i. placing the camera facing toward a rear of the vehicle to obtain the reflected panoramic image,
      ii. inverting the reflected panoramic image obtained from step (e)(i) to create an inverted reflected panoramic image,
      iii. darkening said inverted reflected panoramic image from step (e)(ii) and
      iv. projecting said darkened inverted reflected panoramic image obtained from step (e)(iii) into a shader to create an illusion that said mirror is reflecting said environment in reverse.

5. The method in accordance with claim 4, wherein said environment in step "c" is created within a game engine software application.

6. The method in accordance with claim 4, further comprising: using a computer graphics shader program to create the separate environmental panoramic images.

\* \* \* \* \*